(12) United States Patent
Price et al.

(10) Patent No.: US 8,679,204 B2
(45) Date of Patent: Mar. 25, 2014

(54) FUEL FORMULATIONS

(75) Inventors: Richard John Price, Chester (GB); Nigel Peter Tait, Chester (GB)

(73) Assignee: Shell Oil Company, Houston, TX (US)

( * ) Notice: Subject to any disclaimer, the term of this patent is extended or adjusted under 35 U.S.C. 154(b) by 263 days.

(21) Appl. No.: 12/947,653

(22) Filed: Nov. 16, 2010

(65) Prior Publication Data

US 2011/0126450 A1 Jun. 2, 2011

(30) Foreign Application Priority Data

Nov. 17, 2009 (EP) .................................. 09176201

(51) Int. Cl.
*C10L 1/18* (2006.01)

(52) U.S. Cl.
USPC ........................................................... 44/448

(58) Field of Classification Search
USPC ............................................................ 44/448
See application file for complete search history.

(56) References Cited

U.S. PATENT DOCUMENTS

| | | | |
|---|---|---|---|
| 2,575,543 A | 11/1951 | Young | 44/56 |
| 6,824,574 B2 * | 11/2004 | O'Rear et al. | 44/448 |
| 2002/0020107 A1 | 2/2002 | Bailey et al. | 44/447 |

FOREIGN PATENT DOCUMENTS

| | | | |
|---|---|---|---|
| CN | 1570040 | 1/2005 | C10L 1/18 |
| CN | 101531932 | 9/2009 | C10L 1/04 |
| EP | 1266949 | 12/2002 | C10L 1/06 |
| GB | 716009 | 8/1952 | |
| GB | 802181 | 2/1957 | |
| WO | WO9949003 | 5/1999 | C10L 1/18 |
| WO | WO9921943 | 9/1999 | C10L 1/06 |
| WO | WO2007004789 | 1/2007 | C10L 1/14 |

OTHER PUBLICATIONS

International Search Report dated Apr. 21, 2010.

* cited by examiner

*Primary Examiner* — Cephia D Toomer

(57) ABSTRACT

A compression ignition (CI) (typically diesel) fuel formulation is provided containing (i) a C4 to C8 dialkyl ether (DAE), (ii) a naphtha fuel component and (iii) a low boiling component selected from low boiling hydrocarbons, ethers and mixtures thereof. The formulation may be produced along with a gasoline fuel formulation, by (1) preparing a gasoline fuel formulation in a manner which yields a naphtha fuel component as a byproduct, and (2) blending at least some of the naphtha byproduct with a C4 to C8 DAE and a low boiling component (iii) so as to produce the CI fuel formulation.

19 Claims, No Drawings

FUEL FORMULATIONS

This application claims the benefit of European Application No. 09176201.3 filed Nov. 17, 2009 which is incorporated herein by reference.

FIELD OF THE INVENTION

This invention relates to compression ignition fuel formulations, their preparation and their use.

BACKGROUND TO THE INVENTION

In the interests of the environment, and to comply with increasingly stringent regulatory demands, it is necessary to increase the amount of biofuels used in automotive fuels.

Biofuels are combustible fuels, typically derived from biological sources, which result in a reduction in "well-to-wheels" (i.e. from source to combustion) greenhouse gas emissions. In gasoline fuels for use in spark ignition engines, the most common biofuels are alcohols, in particular ethanol. These are typically blended with more traditional gasoline fuel components. For use in diesel engines, fatty acid methyl esters (FAMEs) such as rapeseed oil methyl ester, soybean oil methyl ester and palm oil methyl ester are the biofuels most commonly blended with conventional diesel fuel components. However, FAMEs and their oxidation products tend to accumulate in engine oil, which has limited their use to 10% v/v or less in fuels burned in many diesel engines. At higher concentrations they can also cause fouling of fuel injectors. FAMEs are also more expensive to produce than ethanol, and their world production levels much lower.

It would be desirable to provide new biofuel-containing compression ignition fuel formulations which could overcome or at least mitigate the above problems.

SUMMARY OF THE INVENTION

According to an embodiment of the present invention there is provided a compression ignition (CI) fuel formulation comprising (i) a C4 to C8 dialkyl ether (DAE), (ii) a naphtha fuel component and (iii) a low boiling component selected from low boiling hydrocarbons, ethers and mixtures thereof.

DETAILED DESCRIPTION OF THE INVENTION

A "compression ignition" or "CI" fuel formulation is one which is suitable and/or adapted for use in a compression ignition (CI) engine. A CI fuel formulation may in particular be a diesel fuel formulation, which is suitable and/or adapted for use in a diesel engine.

The physicochemical properties of naphtha (in particular its volatility and flash point) make it ideal for blending with DAEs such as diethyl ether (DEE). The resultant mixture has a higher cetane number than could be achieved using naphtha alone, and yet, with the inclusion of the low boiling component (iii), its properties are such that it can be safely stored and distributed without generating explosive fuel mixtures, whilst still maintaining appropriate levels of control over evaporative emissions levels. The present invention can thereby make possible the use of relatively high biofuel concentrations in CI fuels, without the complications of injector fouling or engine oil dilution that can arise through the use of higher concentrations of FAMEs.

Diethyl ether (DEE) is a component which can be made from bioethanol (i.e. ethanol derived from a biological source). Due to its high volatility and low auto-ignition temperature, it can be used to help engines start in cold conditions. For this use, it is typically formulated as an aerosol. However, its atypically wide flammability limit makes it unsuitable for use as a compression ignition fuel, despite its good cetane properties, because it could form explosive mixtures with air in storage tanks and pipelines. The mismatch between the boiling and flash points of diesel and DEE also mean that blends of the two could yield explosive gas phase mixtures. As a result, DEE has received little attention as a compression ignition fuel component.

There are a number of potential advantages to a formulation according to the invention. DAEs can be used at higher concentrations than FAMEs, thus yielding higher bioenergy contents. In turn this can lead to significant reductions in greenhouse gas emissions. DAEs also cause lower soot and particulate emissions than conventional diesel fuels, whilst the relatively low carbon content of naphtha (compared to conventional diesel gas oils) can also help reduce particulate formation. The combination of these two factors can reduce the loading on particulate traps in CI engines which run on formulations according to the invention.

A further commercial advantage may arise from the fact that increased use of alcohols (in particular ethanol) as replacements for gasoline fuel components will cause a greater surplus of unused naphtha fuel components and C4 hydrocarbons in the motor oil gasoline pool. The present invention will allow fuel producers to make use of these surpluses, whilst at the same time increasing the proportion of biofuel used in their CI fuel formulations. The present invention can thus support the high volume use of alcohols in gasoline fuels.

In one embodiment of the invention, the dialkyl ether (i) may be either a symmetric or an asymmetric dialkyl ether, suitably a symmetric dialkyl ether. It has a total of from 4 to 8 carbon atoms. Its two alkyl groups may be straight chain alkyl groups, i.e. selected from ethyl, n-propyl and n-butyl. It may for example be selected from diethyl ether (DEE), di-n-propyl ether, di-n-butyl ether and mixtures thereof. In a preferred embodiment, it is DEE.

In an embodiment, the dialkyl ether (i) is a C4 to C8 dialkyl ether which has a measured cetane number (ASTM D613) of 40 or greater, or of 45 or 50 or greater. This allows its use to increase the cetane number of the naphtha-containing fuel formulation.

The DAE used in the present invention may be obtained from any known source, of which many are already available. DEE for instance can be synthesised by the dehydration of ethanol (currently the most cost efficient biofuel to manufacture from land-based biomass), for example using a low temperature conversion over an alumina catalyst. Thus, biological sources of ethanol, such as sugar, starch and cellulose, may also be used as a source of DEE for the biofuel-containing formulations of the invention.

The naphtha fuel component (ii) is a liquid hydrocarbon distillate fuel component containing hydrocarbons which will typically boil below 205° C. (ASTM D-86 or EN ISO 3405), such as from 40 to 205° C. A wide range of different types of naphtha may be used as the component (ii). For example, the component may be a "light naphtha" (the constituents of which typically boil below 100° C.), a "heavy naphtha" (the constituents of which typically have boiling points from 100 to 205° C.) or a mixture thereof. Its constituents (or the majority, for instance 95% w/w or greater, thereof) will typically be hydrocarbons having 5 or more, usually from 5 to 12, carbon atoms; they will usually be paraffinic, naphthenic and aromatic. The component (ii) will typically have a cetane number (ASTM D613) from about 20 to 55, more typically from about 30 to 40, and will usually contain less than 20% w/w of aromatic hydrocarbons. Such properties will depend to an extent on the source of the naphtha, for example for a refinery naphtha on the type of crude oil from which it is derived, or for a synthetic naphtha on the temperature, pressure, catalyst and other conditions of the synthesis.

The naphtha fuel component (ii) may be obtained from any suitable source. It may for example be derived from petroleum, coal tar, natural gas or wood, in particular petroleum. Alternatively it may be a synthetic product such as from a Fischer-Tropsch synthesis. In an embodiment, it is derived from a biological source; this can make it possible for most if not all of the invented formulation to be bio-derived.

In an embodiment of the invention, the naphtha fuel component is a product of a Fischer-Tropsch synthesis, since such products tend to have better cetane properties than their petroleum-derived counterparts. Naphtha fuel components may for instance be produced as byproducts of a Fischer-Tropsch gas oil synthesis. A Fischer-Tropsch derived naphtha fuel component may have a final boiling point of up to 220° C., or of up to 180 or 175° C. Its initial boiling point may be at least 25° C., or at least 30 or 35° C. Boiling points may be measured using ASTM D86. It may have a density of from 0.67 to 0.73 g/cm$^3$ at 15° C. (ASTM D4052 or EN ISO 3675) and/or a sulphur content (ASTM D2622 or EN ISO 20846) of 5 mg/kg or less, or of 2 mg/kg or less.

A Fischer-Tropsch derived naphtha component may consist of at least 70% w/w, or at least 80% w/w, or at least 90 or 95 or 98% w/w, or at least 99 or 99.5 or even 99.8% w/w, of paraffinic components, typically iso- and normal paraffins. It may contain from 20 to 98% w/w or greater of normal paraffins. The weight ratio of iso-paraffins to normal paraffins in the component may suitably be greater than 0.1 and may be up to 12; suitably it is from 2 to 6.

By virtue of the Fischer-Tropsch process, a Fischer-Tropsch derived naphtha has essentially no, or undetectable levels of, sulphur and nitrogen. Compounds containing these heteroatoms tend to act as poisons for Fischer-Tropsch catalysts and are therefore removed from the synthesis gas feed. Further, the Fischer-Tropsch process as usually operated produces no or virtually no aromatic components. The aromatics content of a Fischer-Tropsch derived naphtha, suitably determined by ASTM D4629, will typically be 2% w/w or lower, or 1% w/w or lower, or 0.5 or 0.2 or 0.1% w/w or lower. The olefin content of a Fischer-Tropsch derived naphtha component may be 2% w/w or lower, or 1% w/w or lower, or 0.5% w/w or lower.

Generally speaking, Fischer-Tropsch derived naphthas have relatively low levels of polar components, in particular polar surfactants, for instance compared to petroleum derived naphthas. Such polar components may include for example oxygenates, and sulphur- and nitrogen-containing compounds. A low level of sulphur in a Fischer-Tropsch derived naphtha is generally indicative of low levels of both oxygenates and nitrogen containing compounds, since all are removed by the same treatment processes.

The flash points of naphtha and DAEs such as DEE are lower than those for conventional diesel fuel components. It is therefore important that in a mixture of a DAE and naphtha, the gaseous composition above the liquid fuel—for example in a storage tank or pipeline—should be sufficiently rich in fuel vapour to lie above the mixture's upper flammability limit. This is achieved by combining the DAE and naphtha fuel component with the low boiling component (iii). The component (iii) may suitably have a boiling point of 50° C. or below, or of 20° C. or below. It may have a boiling point for instance of −50° C. or greater, or of −20° C. or greater, such as from −50 to +50° C. or from −20 to +20° C. A boiling point less than about −20° C. could mean that the reduction of vapour pressure through evaporative losses occurs too rapidly, resulting in the potential formation of explosive vapours during storage and transportation. However, a boiling point greater than about 20° C. could require too high a concentration of the component (iii) in the fuel formulation, resulting in an undesirable decrease in the blend ratio of the naphtha component (ii).

In an embodiment of the invention, the component (iii) comprises a hydrocarbon selected from C3 to C5 hydrocarbons (for example propane, propene, n-butane, isobutane, isobutene, but-1-ene, cis-but-2-ene, trans-but-2-ene, 2-methyl-but-1-ene, 3-methyl-but-1-ene, 2-methyl-but-2-ene, n-pentane, isopentane, pent-1-ene, cis-pent-2-ene, trans-pent-2-ene, cyclopentane or cyclopentene) and mixtures thereof. In an embodiment it comprises a hydrocarbon selected from n-butane, isobutane, isobutene, but-1-ene, cis-but-2-ene, trans-but-2-ene, 3-methyl-but-1-ene and mixtures thereof. In an embodiment it comprises a C4 hydrocarbon, in particular n-butane, isobutane or a mixture thereof.

In another embodiment, the component (iii) comprises a "refinery butane", which is a refinery stream typically comprising a mixture of propane, propene, n-butane, isobutane, isobutene, but-1-ene, cis-but-2-ene, trans-but-2-ene, n-pentane, isopentane and relatively minor amounts of other low boiling hydrocarbons.

In an embodiment the component (iii) comprises a dialkyl ether, in particular a di(C1 to C3 alkyl) ether such as dimethyl ether or methyl ethyl ether. In an embodiment it may be preferred for the component (iii) not to be dimethyl ether. In an embodiment, it may be preferred for the component (iii) not to be DEE. In an embodiment it comprises methyl ethyl ether.

The low boiling component (iii) may therefore comprise a component selected from n-butane, isobutane, isobutene, but-1-ene, cis-but-2-ene, trans-but-2-ene, 3-methyl-but-1-ene, methyl ethyl ether and mixtures thereof. It may comprise a component selected from isobutane, n-butane, methyl ethyl ether and mixtures thereof. Ethers and mixtures thereof may in some instances be preferred, since the cetane numbers of ethers tend to be higher than those of the C3 to C5 hydrocarbons.

Where the low boiling component (iii) is an ether, it is suitably different to the DAE (i) in the formulation.

In an embodiment of the invention, the component (iii) may comprise a mixture of two or more different low boiling materials. The individual materials which constitute the component (iii) may then be of the types described above.

A fuel formulation according to the invention suitably has a measured cetane number (ASTM D613) of 20 or greater, or of 30 or 40 or greater. It may have a cetane number of 45 or greater, or of 50 or 51 or in cases 55 or greater. Its cetane number may for instance be up to 70. The cetane number of a formulation according to the invention may be calculated from the cetane numbers of its individual components (i) to (iii), using linear blending rules for hydrocarbons together with appropriate blending cetane numbers for the ether component(s).

The formulation suitably has a vapour composition which is greater than its upper flammability limit at 0° C. It may have a vapour composition which is at least 1.2 or 1.5 or 1.8 or 2 times its upper flammability limit at 0° C. It may have a vapour composition which is greater than, or at least the relevant multiple of, its upper flammability limit at 5 or 8 or 10° C., in particular where the formulation is intended for use as a summer grade fuel in warmer climates.

Flammability limits define the proportion of combustible gases in a mixture, between which limits the mixture is flammable. The lower flammability limit (LFL) describes the leanest mixture that is still flammable, ie the mixture with the smallest fraction of combustible gas, whilst the upper flammability limit (UFL) gives the richest flammable mixture. LFL and UFL values for a fuel formulation or component may be measured for example using the method described by Vaivads R H et al in *SAE* 950401, "Flammability tests of alcohol/gasoline vapours".

Flammability limits for mixtures of fuel components can be calculated using Le Chatelier's mixing rule for combustible volume fractions:

$$UFL_{mix} = \frac{1}{\sum \frac{Xi}{UFLi}}$$

where:
$UFL_i$=upper flammability limit of component i
$X_i$=volume fraction of component i.

Vapour compositions may also be measured using the method described by Vaivads R H et al (see above).

The formulation suitably has a vapour pressure at 37.8° C. (Reid Vapour Pressure, RVP) of 100 kPa or less. It may have an RVP of 60 kPa or less, in particular where it is intended for use as a summer grade fuel. Vapour pressures may be measured using the standard test method EN 13016-1. Vapour pressures for mixtures of fuel components may be calculated as described in the examples below.

In an embodiment, the fuel formulation has a vapour composition which is greater than its upper flammability limit at 0° C., and a Reid vapour pressure (EN 13016-1) of 100 kPa or less. Such a formulation might be suitable for use as a winter grade fuel.

In another embodiment, the fuel formulation has a vapour composition which is greater than its upper flammability limit at 10° C., and a Reid vapour pressure (EN 13016-1) of 60 kPa or less. Such a formulation might be suitable for use as a summer grade fuel.

The formulation of the invention should be suitable for use in a compression ignition (typically diesel) internal combustion engine. Such an engine may be either heavy or light duty. The formulation may in particular be suitable for use as an automotive fuel.

In an embodiment of the fuel formulation according to the invention, the concentration of the DAE may be 0.01% v/v or greater, or 0.1 or 0.5 or 1% v/v or greater, for example at least 2 or 5 or 10% v/v or in cases at least 15 or 20 or 25 or 30 or 35 or 40% v/v. The concentration of the DAE may be up to 95 or 94% v/v, or up to 90 or 85 or 80 or 75 or 60% v/v, for example up to 55 or 50 or 45 or 40 or 35 or 30% v/v. In an embodiment, the DAE concentration may be from 1 to 60% v/v or from 5 to 50% v/v, or from 10 to 30% v/v.

The concentration of the naphtha fuel component (ii) in the formulation may be 0.01% v/v or greater, or 0.1 or 1 or 5% v/v or greater. It may be 10% v/v or greater, or 15 or 20 or 25 or 30 or 35 or 40% v/v or greater, for example at least 45 or 50% v/v. Its concentration may be up to 98% v/v, for example up to 95 or 90 or 85% v/v. Its concentration may for example be in the range from 45 to 95% v/v.

The concentration of the low boiling component (iii) in the formulation may be 0.01% v/v or greater, or 0.1 or 0.5% v/v or greater, for example at least 1 or 2 or 5 or 8% v/v. Its concentration may be up to 30% v/v, for example up to 25 or 20 or in some cases 15 or 12 or 10% v/v. A suitable concentration will depend on the nature of the component (iii) and on the properties required of the overall fuel formulation. Winter grade formulations, for use in colder climates, may for instance require higher concentrations of the component (iii).

The relative concentrations of the components (i) to (iii) may be chosen to achieve desired properties for the formulation as a whole, for example a minimum desired cetane number and/or vapour composition, and/or a maximum desired RVP, ideally all three. Thus the relative concentrations will also depend on the physicochemical properties of the individual components. Suitable concentrations may be calculated by applying appropriate blending rules to the properties (for example cetane number) of the individual components, and may be visualised using a triangle three-way composition plot. For these purposes, blending numbers may need to be used for the properties of some of the components, in particular the ethers. For example, when calculating the cetane number of a fuel formulation according to the invention, the blending cetane number for DEE may be taken to be approximately 90.

Suitable concentration ratios are given in the examples below. A certain minimum concentration of the component (iii) will be needed to ensure that the gas phase composition of the formulation is sufficiently fuel rich, whilst too high a concentration could reduce control over evaporative emissions.

An embodiment of the fuel formulation according to the invention may contain standard fuel or refinery additives which are suitable for use in compression ignition (in particular diesel) fuels. Many such additives are known and commercially available. The formulation may for example contain an antioxidant, to reduce the tendency of the DAE to form peroxides such as diethyl ether hydroperoxide or the explosive diethyl ether peroxide. Commercially available DEE often contains trace amounts of antioxidants such as BHT; these too may be incorporated into a fuel formulation according to the invention.

The formulation may contain a lubricity enhancing additive. It may contain a viscosity improver or other viscosity-increasing fuel component or additive.

In an embodiment, a fuel formulation according to the invention contains less than 10% v/v of alcohols, in particular C1 to C4 or C1 to C3 or C1 to C2 aliphatic alcohols such as methanol, butanol and more particularly ethanol. It may contain less than 8 or 5 or 3% v/v of such alcohols. In cases, it may be free or substantially free of (for example, containing less than 1% v/v of) such alcohols.

In an embodiment, a formulation according to the invention contains less than 20% v/v of gasoline fuel components, which are liquid hydrocarbon fuel components typically having boiling points from 25 to 210 or 220° C. and being suitable for use in spark ignition (petrol) engines. The formulation may contain less than 15 or 10 or 5 or 3% v/v of such components. In cases, it may be free or substantially free of (for example, containing less than 1% v/v of) such components.

The formulation may contain one or more additional CI fuel components which are suitable for combustion within a CI engine. An additional CI fuel component may for instance be a diesel fuel component of known type. A diesel fuel component is typically a liquid hydrocarbon middle distillate fuel, more typically a gas oil. It may be petroleum derived. Alternatively it may be synthetic: for instance it may be the product of a Fischer-Tropsch condensation. It may be derived from a biological source.

An additional CI fuel component will typically boil in the range from 150 to 370° C. (ASTM D86 or EN ISO 3405). It will suitably have a measured cetane number (ASTM D613) of 40 or greater, or 45 or 50 or 51 or greater.

The concentration of an additional CI fuel component in the fuel formulation of the invention is likely to be in the range from 0.1 to 60% v/v, or from 0.1 to 50 or 40 or 30% v/v, or from 0.1 to 20 or 10% v/v.

According to another embodiment of the present invention, there is provided a process for the preparation of a CI fuel formulation, which process involves blending together (i) a C4 to C8 DAE, (ii) a naphtha fuel component and (iii) a low boiling component selected from low boiling hydrocarbons, ethers and mixtures thereof, optionally with one or more fuel additives. In order to maximise the benefits of the present invention, for example the benefits to society of reducing particulate emissions and well-to-wheels greenhouse gas emissions, the process may be used to produce at least 1,000 liters of the fuel formulation, or at least 5,000 or 10,000 or 20,000 or 50,000 liters.

In yet another embodiment of the invention provides a method of operating an internal combustion engine, and/or a vehicle which is driven by an internal combustion engine, which method involves introducing into a combustion chamber of the engine a CI fuel formulation according to the first aspect of the invention. The engine is preferably a compression ignition (typically diesel) engine. It may be of the direct injection type, for example of the rotary pump, in-line pump, unit pump, electronic unit injector or common rail type, or of the indirect injection type. It may be a heavy or a light duty engine. It may be equipped with fuel pumps and/or sealing materials which are adapted for use with relatively low viscosity fuels, since both DAEs and naphtha have lower viscosities than conventional diesel fuel components. Instead or in addition the engine may be operated at relatively low fuel injection pressures, for example at pressures of 20% or less of those of conventional diesel engines, or at pressures of 15 or 10 or 5 or 3 or 2% or less of those of conventional diesel engines. In an embodiment, the engine is of the common rail type.

According to another embodiment, there is provided a method for producing both a gasoline fuel formulation and a CI fuel formulation, the method involving (1) preparing a gasoline fuel formulation in a manner which yields a naphtha fuel component as a byproduct, and (2) blending at least some of the naphtha byproduct with a C4 to C8 DAE and a low boiling component (iii) of the type described above, optionally with other fuel components or additives, so as to produce a CI fuel formulation. In this context a "byproduct" means a product which is not used in the gasoline formulation prepared in step (1).

The step (1) may involve generating fuel components, including a naphtha fuel component, from a source such as crude oil, or by a synthetic route such as a Fischer-Tropsch condensation reaction, and using less than all of the naphtha fuel component in the gasoline fuel formulation. It may for instance involve replacing a quantity of the naphtha fuel component with an oxygenate such as an alcohol (in particular ethanol) in order to prepare the gasoline formulation. Step (1) may also yield a C3 to C5, in particular C4, hydrocarbon as an additional byproduct, in which case step (2) may involve blending the DAE and the naphtha byproduct with at least some of the additional byproduct instead of or in addition to the low boiling component (iii).

Throughout the description and claims of this specification, the words "comprise" and "contain" and variations of the words, for example "comprising" and "comprises", mean "including but not limited to", and do not exclude other moieties, additives, components, integers or steps. Moreover the singular encompasses the plural unless the context otherwise requires: in particular, where the indefinite article is used, the specification is to be understood as contemplating plurality as well as singularity, unless the context requires otherwise.

Preferred features of each aspect of the invention may be as described in connection with any of the other aspects. Other features of the invention will become apparent from the following examples. Generally speaking the invention extends to any novel one, or any novel combination, of the features disclosed in this specification (including any accompanying claims and drawings). Thus features, integers, characteristics, compounds, chemical moieties or groups described in conjunction with a particular aspect, embodiment or example of the invention are to be understood to be applicable to any other aspect, embodiment or example described herein unless incompatible therewith. Moreover unless stated otherwise, any feature disclosed herein may be replaced by an alternative feature serving the same or a similar purpose.

The present invention will now be further described with reference to the following non-limiting examples.

Example 1

CI fuel formulations according to the invention may be prepared by blending together DEE, a naphtha fuel component and a low boiling hydrocarbon mixture C4, in the concentrations shown in Table 1 below.

TABLE 1

| | Blend Ratios | | |
| --- | --- | --- | --- |
| Example | Naphtha (% v/v) | C4 (% v/v) | DEE (% v/v) |
| A | 78 | 12 | 10 |
| B | 61 | 9 | 30 |
| C | 48 | 7 | 45 |
| D | 69 | 4 | 27 |
| E | 91 | 4 | 5 |

The naphtha fuel component is a Fischer-Tropsch derived naphtha synthesised using the Shell™ "Gas-to-Liquid" (GtL) process. It has a cetane number of 44, a boiling range of 59 to 182° C. and a density at 15° C. of 685 kg/m$^3$ (all determined from GC-FID data). Its composition is shown in Table 2 below.

TABLE 2

Naphtha Composition

| Carbon no. | n-paraffins (% v/v) | Iso-paraffins (% v/v) | n-olefins (% v/v) | Iso-olefins (% v/v) | Cyclic olefins (% v/v) | Dienes (% v/v) | Naphthenes (% v/v) | Aromatics (% v/v) |
|---|---|---|---|---|---|---|---|---|
| 3 | 0.02 | 0.02 | 0.00 | 0.00 | 0.00 | 0.00 | 0.00 | 0.00 |
| 4 | 1.22 | 0.50 | 0.00 | 0.00 | 0.00 | 0.00 | 0.00 | 0.00 |
| 5 | 6.60 | 4.27 | 0.00 | 0.00 | 0.00 | 0.00 | 0.00 | 0.00 |
| 6 | 12.17 | 6.59 | 0.00 | 0.00 | 0.00 | 0.07 | 0.19 | 0.00 |
| 7 | 14.44 | 8.18 | 0.00 | 0.00 | 0.00 | 0.00 | 0.23 | 0.02 |
| 8 | 14.33 | 8.32 | 0.00 | 0.08 | 0.00 | 0.00 | 0.55 | 0.00 |
| 9 | 10.50 | 6.14 | 0.00 | 0.00 | 0.00 | 0.00 | 0.00 | 0.00 |
| 10 | 5.07 | 0.47 | 0.00 | 0.00 | 0.00 | 0.00 | 0.00 | 0.00 |
| 11 | 0.00 | 0.00 | 0.00 | 0.00 | 0.00 | 0.00 | 0.00 | 0.00 |
| 12 | 0.00 | 0.00 | 0.00 | 0.00 | 0.00 | 0.00 | 0.00 | 0.00 |

The low boiling hydrocarbon mixture C4 is a refinery C4 stream (ex. Shell) having the composition shown in Table 3 below.

TABLE 3

C4 Composition

| Component | Concentration (% v/v) |
|---|---|
| Propene | 0.3 |
| Propane | 4.8 |
| Isobutane | 30.3 |
| Isobutene | 1.7 |
| But-1-ene | 0.7 |
| n-butane | 57.2 |
| Trans-but-2-ene | 2.4 |
| Cis-but-2-ene | 1.3 |
| Isopentane | 1.0 |
| n-pentane | 0.1 |
| Not known | 0.2 |

Table 4 shows the lower heating value (net calorific value) LHV, Reid vapour pressure RVP, cetane number CN, oxygen content, hydrogen:carbon ratio H/C, upper flammability limit (UFL), vapour compositions and density for each of the resultant blends, as well as for the neat components. Figures for the blends have been calculated using accepted blending rules; vapour pressures for example were calculated using the Antoine equation (derived from the Clausius-Clapeyron relation).

It can be seen from Tables 1 and 4 that blends of a DAE with a Fischer-Tropsch derived naphtha and a low boiling hydrocarbon component can be tailored to have cetane numbers, RVPs and upper flammability limits within ranges which are acceptable for use in CI engines. These blends, in accordance with the invention, can be burned in CI engines and can also be safely handled within existing liquid fuel distribution systems.

An important advantage of fuel formulations according to the invention is the reduction in greenhouse gas (GHG) emissions which they are likely to yield compared to the use of conventional gasoline or diesel fuels. Even at relatively low DAE concentrations, there will be an advantage to burning low carbon naphtha rather than a higher carbon diesel fuel component. The greater the concentration of the DAE oxygenate, however, the greater the GHG saving.

Example 2

A further CI fuel formulation according to the invention was prepared by blending together 20.0% v/v DEE, 73.1% v/v of a naphtha fuel component and 6.9% v/v butane.

The naphtha was a blend of hydrocarbon solvents (ex Shell), which had a cetane number of 37.5 (determined from reformulyzer data) and a final boiling point below 180° C. (ASTM D86). The composition of the naphtha is shown in Table 5 below.

TABLE 4

Blend Properties

| Blend/component | LHV (MJ/kg) | RVP (kPa) | CN | Ox (% m) | H/C | UFL (% v/v in air) | Vapour composition at 0° C. (% v/v) | Vapour composition at 10° C. (% v/v) | Density @ 15° C. (kg/m$^3$) |
|---|---|---|---|---|---|---|---|---|---|
| A | 43.4 | 100 | 45 | 2.3 | 2.32 | 8.4 | 26.1 | 38.3 | 675 |
| B | 41.2 | 100 | 55 | 6.8 | 2.35 | 10.1 | 24.8 | 37.0 | 684 |
| C | 39.6 | 100 | 63 | 10.1 | 2.38 | 11.9 | 24.2 | 36.6 | 690 |
| D | 41.5 | 79 | 55 | 6.1 | 2.34 | 9.7 | 19.4 | 28.2 | 688 |
| E | 43.9 | 64 | 45 | 1.1 | 2.29 | 7.9 | 15.9 | 22.9 | 681 |
| DEE | 33.8 | 106 | 90 | 21.2 | 2.50 | 36 | 35.6 | 35.7 | 713 |
| Naphtha | 44.4 | 39 | 44 | 0.0 | 2.28 | 7.6[1] | 9.0 | 13.8 | 685 |
| C4 | 45.3 | 353 | 14 | 0.0 | 2.50 | 8.4 | * | * | 583 |

[1] assumed to be the same as gasoline
*temperature greater than boiling point of C4

TABLE 5

Naphtha Composition

| Carbon no. | n-paraffins (% v/v) | Iso-paraffins (% v/v) | Naphthenes (% v/v) | Aromatics (% v/v) |
|---|---|---|---|---|
| 3 | 0.00 | 0.00 | 0.00 | 0.00 |
| 4 | 0.00 | 0.00 | 0.00 | 0.00 |
| 5 | 0.00 | 0.00 | 0.00 | 0.00 |
| 6 | 0.81 | 0.04 | 3.10 | 0.01 |
| 7 | 10.12 | 8.60 | 7.94 | 0.03 |
| 8 | 8.92 | 10.08 | 10.17 | 0.02 |
| 9 | 3.35 | 13.86 | 8.92 | 0.00 |
| 10 | 0.62 | 6.53 | 5.49 | 0.00 |
| 11 | 0.00 | 1.22 | 0.02 | 0.00 |
| 12+ | 0.00 | 0.01 | 0.14 | 0.00 |

The properties of the CI fuel formulation were calculated as described above and are summarised in Table 6 below. The RVP and density were measured (EN 13016-1 and ASTM D4052 respectively) at 68.3 kPa and 723 kg/m³ respectively. Table 6 also shows the relevant properties for the naphtha fuel component.

TABLE 6

CI Fuel & Naphtha Properties

| Blend/component | LHV (MJ/kg) | RVP (kPa) | CN | Oxygen (% m) | H/C | UFL (% v/v in air) | Vapour composition at 0° C. (% v/v) | Vapour composition at 10° C. (% v/v) | Density @ 15° C. (kg/m³) |
|---|---|---|---|---|---|---|---|---|---|
| Blend | 42.3 | 70 | 45 | 4.3 | 2.21 | 9.1 | 17.8 | 26.4 | 714 |
| Naphtha | 44.4 | 10 | 37 | 0.0 | 2.15 | 7.6[1] | 1.0 | 1.8 | 729 |

[1] assumed to be the same as gasoline

A 0.537 liter single cylinder 4-valve diesel engine, with a compression ratio of 16:1, was successfully run on this fuel formulation across four different speed and load conditions. No ignition problems or engine performance issues were encountered.

Thus, a formulation according to the invention can be tailored to have the cetane and other properties needed to make it suitable for use in a compression ignition engine.

Example 3

This example assessed the emissions generated by a CI fuel formulation according to the invention, on combustion in a diesel engine.

The engine used was a 0.537 liter single cylinder diesel engine with a compression ratio of 16:1. The engine's exhaust was used to supply exhaust gas recirculation (EGR) and when used the exhaust backpressure was set 0.2 bar higher than the inlet pressure. The recirculated gases were cooled to the same temperature as the inlet air temperature. In-cylinder pressure was measured with a water-cooled piezoelectric pressure transducer (Kistler™ 6041A). The pressure signal was acquired over 250 cycles by an AVL system and the heat release and heat release rate were monitored on a screen.

Emissions were measured using a Horiba™ MEXA-9500H system and soot was measured by an AVL™ 415 smoke meter.

Fuel was injected by a Bosch™ 7-hole injector with hole diameters of 0.13 mm. The engine had an independent fuel injection system which was used to control the injection pressure, the crank angle position and the duration of injector pulses. The intake temperature was held to a nominal 40° C. and was controlled using heaters and a compression intercooler. The fuel flow rate was calculated using equations 4.64 and 4.65 from Dec J E, *SAE* 970873, 1997, "A conceptual model of DI diesel combustion based on laser sheet imaging", using the measured air consumption rate and the exhaust emissions.

The CI fuel formulation was that used in Example 2. Its emissions performance was compared with that of a commercially available zero sulphur diesel fuel (ZSD, ex Shell) having the composition and properties shown in Table 7 below. The diesel fuel was a refinery product and was EN 590-compliant.

TABLE 7

| Parameter | Method | Units | ZSD |
|---|---|---|---|
| Cetane number | ASTM D613 | — | 54.1 |
| Density @ 15° C. | IP 365 | kg m⁻³ | 833.3 |
| Flash point | IP 34 | ° C. | 64.0 |
| Distillation: | IP 123 | | |
| IBP | | ° C. | 164.6 |
| 10% rec | | ° C. | 209.7 |
| 20% rec | | ° C. | 234.8 |
| 30% rec | | ° C. | 253.0 |
| 40% rec | | ° C. | 267.0 |
| 50% rec | | ° C. | 278.0 |
| 60% rec | | ° C. | 288.6 |
| 70% rec | | ° C. | 298.7 |
| 80% rec | | ° C. | 310.7 |
| 90% rec | | ° C. | 326.2 |
| 95% rec | | ° C. | 340.4 |
| FBP | | ° C. | 352.4 |
| Residue | | % vol | 1.3 |
| Recovery | | % vol | 98.2 |
| Loss | | % vol | 0.5 |
| Rec @ 240 C. | | % vol | 22.4 |
| Rec @ 250 C. | | % vol | 28.2 |
| Rec @ 340 C. | | % vol | 94.9 |
| Rec @ 350 C. | | % vol | 96.8 |
| Rec @ 370 C. | | % vol | |
| Lubricity | ISO 12156 | μm | 285 |
| Viscosity @ 40° C. | IP 71 | mm² s⁻¹ | 2.83 |
| Sulphur - WD XRF | ISO 20884 | mg/kg | 7.0 |
| CFPP | IP 309 | ° C. | −18, −16 |
| Cloud point | IP 219 | ° C. | −7 |
| Mono aromatics | IP 391/06 | % m/m | 22.1 |
| Di aromatics | IP 391/06 | % m/m | 3.2 |
| Tri aromatics | IP 391/06 | % m/m | 0.3 |
| Total aromatics | IP 391/06 | % m/m | 25.6 |
| Carbon | ASTM D5291 | % m/m | 85.3 |
| Hydrogen | ASTM D5291 | % m/m | 13.9 |
| Oxygen | ASTM D5622 | % m/m | 0.1 |
| Calorific value | IP 12 | Cal (IT)/g | |

TABLE 7-continued

| Parameter | Method | Units | ZSD |
|---|---|---|---|
| Gross | | | 10940 |
| Net | | | 10235 |
| C:H ratio | | | 1.96 |

The emissions results are shown in Tables 8 to 11 below. The conditions used to generate these data were as follows:

Table 8—Fuel: ZSD; engine speed 2,000 rpm; IMEP 6.9 bar; inlet manifold pressure 1.4 bar; inlet manifold temp 40° C.; 1300 bar injection pressure; exhaust manifold pressure 1.6 bar; fuel injection timing varied to achieve peak pressure at 10° crank angle after top dead centre.

Table 9—Fuel: Example 2 blend; engine speed 2,000 rpm; IMEP 6.9 bar; inlet manifold pressure 1.4 bar; inlet manifold temp 40° C.; 1300 bar injection pressure; exhaust manifold pressure 1.6 bar; fuel injection timing varied to achieve peak pressure at 10° crank angle after top dead centre.

Table 10—Fuel: ZSD; engine speed 2,000 rpm; IMEP 9.0 bar; inlet manifold pressure 1.6 bar; inlet manifold temp 40° C.; 1300 bar injection pressure; exhaust manifold pressure 1.8 bar; fuel injection timing varied to achieve peak pressure at 10° crank angle after top dead centre.

Table 11—Fuel: Example 2 blend; engine speed 2,000 rpm; IMEP 9.0 bar; inlet manifold pressure 1.6 bar; inlet manifold temp 40° C.; 1300 bar injection pressure; exhaust manifold pressure 1.8 bar; fuel injection timing varied to achieve peak pressure at 10° crank angle after top dead centre.

TABLE 8

| EGR % | CO G/kW·h | HC g/kW·h | NOx g/kW·h | Smoke FSN |
|---|---|---|---|---|
| 60.3 | 16.41 | 0.58 | 0.03 | 1.14 |
| 56.3 | 7.87 | 0.47 | 0.07 | 2.99 |
| 50.4 | 3.76 | 0.45 | 0.15 | 2.65 |
| 44.6 | 2.71 | 0.44 | 0.29 | 1.28 |
| 40.5 | 2.19 | 0.43 | 0.58 | 0.40 |
| 35.1 | 1.91 | 0.42 | 0.73 | 0.20 |
| 31.4 | 1.65 | 0.41 | 1.21 | 0.14 |
| 25.7 | 1.41 | 0.41 | 1.90 | 0.13 |
| 19.7 | 1.28 | 0.42 | 2.54 | 0.12 |
| 15.5 | 1.22 | 0.43 | 3.23 | 0.11 |
| 10.0 | 1.14 | 0.45 | 4.21 | 0.11 |
| 4.8 | 1.15 | 0.44 | 4.98 | 0.10 |
| 0.0 | 1.13 | 0.49 | 5.08 | 0.07 |

TABLE 9

| EGR % | CO g/kW·h | HC g/kW·h | NOx g/kW·h | Smoke FSN |
|---|---|---|---|---|
| 55.6 | 19.84 | 0.83 | 0.03 | 0.06 |
| 50.9 | 14.73 | 0.67 | 0.05 | 0.28 |
| 50.5 | 7.46 | 0.65 | 0.07 | 0.10 |
| 45.4 | 3.76 | 0.64 | 0.15 | 0.02 |
| 40.7 | 3.10 | 0.64 | 0.23 | 0.02 |
| 36.2 | 2.31 | 0.61 | 0.47 | 0.03 |
| 29.6 | 1.82 | 0.62 | 0.94 | 0.00 |
| 25.7 | 1.52 | 0.61 | 1.38 | 0.01 |
| 20.1 | 1.30 | 0.63 | 2.20 | 0.01 |
| 15.4 | 1.13 | 0.68 | 3.19 | 0.01 |
| 10.1 | 1.19 | 0.73 | 3.99 | 0.01 |
| 4.8 | 1.12 | 0.76 | 4.92 | 0.01 |
| 0.1 | 1.12 | 0.76 | 5.83 | 0.01 |

TABLE 10

| EGR % | CO G/kW·h | HC g/kW·h | NOx g/kW·h | Smoke FSN |
|---|---|---|---|---|
| 56.1 | 12.89 | 0.33 | 0.04 | 5.29 |
| 50.5 | 3.56 | 0.22 | 0.10 | 5.54 |
| 44.7 | 1.37 | 0.22 | 0.23 | 3.74 |
| 35.8 | 0.96 | 0.21 | 0.39 | 0.87 |
| 29.5 | 0.71 | 0.22 | 0.81 | 0.37 |
| 25.3 | 0.61 | 0.22 | 1.23 | 0.32 |
| 20.2 | 0.57 | 0.24 | 1.65 | 0.26 |
| 15.3 | 0.53 | 0.25 | 2.50 | 0.21 |
| 10.4 | 0.55 | 0.27 | 3.15 | 0.17 |
| 0.0 | 0.49 | 0.31 | 4.05 | 0.23 |

TABLE 11

| EGR % | CO g/kW·h | HC g/kW·h | NOx g/kW·h | Smoke FSN |
|---|---|---|---|---|
| 60.5 | 29.19 | 1.71 | 0.01 | 0.02 |
| 56.3 | 11.88 | 0.53 | 0.04 | 0.28 |
| 50.6 | 7.23 | 0.44 | 0.07 | 0.85 |
| 45.0 | 2.43 | 0.40 | 0.13 | 0.18 |
| 39.4 | 1.50 | 0.40 | 0.21 | 0.09 |
| 34.4 | 1.05 | 0.40 | 0.45 | 0.04 |
| 30.7 | 0.84 | 0.40 | 0.67 | 0.04 |
| 29.8 | 0.98 | 0.42 | 0.68 | 0.03 |
| 25.6 | 0.69 | 0.41 | 1.21 | 0.04 |
| 20.5 | 0.59 | 0.42 | 1.96 | 0.03 |
| 15.0 | 0.56 | 0.43 | 2.84 | 0.03 |
| 10.7 | 0.50 | 0.43 | 3.61 | 0.02 |
| 4.9 | 0.49 | 0.45 | 4.54 | 0.02 |
| 0.1 | 0.46 | 0.46 | 5.12 | 0.01 |

The data in Tables 8 to 11 show how the brake specific NOx engine-out emissions are reduced, using both fuels, when the rate of EGR is increased (compare Table 8 with Table 10 and Table 9 with Table 11). Importantly, however, the smoke emissions are significantly reduced by changing the fuel from the conventional diesel fuel ZSD to the CI formulation of the invention (compare the FSN (Filter Smoke Number) data in Tables 8 and 9, and in Tables 10 and 11). This effect would be expected to reduce the burden on the particulate trap and hence reduce the frequency with which it needed to be regenerated.

The reduction in smoke emissions is accompanied by a smaller increase in brake specific HC and CO engine-out emissions, but these would be converted to $CO_2$ and $H_2O$ by the oxidation catalysts typically fitted in road vehicles to reduced tailpipe emissions from CI engines.

Example 4

Alternative CI fuel formulations according to the invention may be prepared by blending together diethyl ether, a hydrotreated refinery naphtha component and a low boiling component C4A, in the concentrations shown in Table 12 below.

TABLE 12

| Example | Blend Ratios Naphtha (% v/v) | C4A (% v/v) | DEE (% v/v) |
|---|---|---|---|
| A | 69 | 14 | 17 |
| B | 63 | 12 | 25 |
| C | 45 | 8 | 47 |
| D | 69 | 7 | 24 |
| E | 77 | 7 | 16 |
| F | 79 | 6 | 15 |
| G | 73 | 4 | 23 |
| H | 64 | 2 | 34 |

TABLE 12-continued

| Example | Blend Ratios Naphtha (% v/v) | C4A (% v/v) | DEE (% v/v) |
|---|---|---|---|
| I | 74 | 3 | 23 |
| J | 82 | 4 | 14 |

The naphtha fuel component is a petroleum derived hydrotreated refinery naphtha, ex Shell. It has a cetane number of 32, a boiling range of 104 to 186° C. and a density at 15° C. of 733 kg/m$^3$ (determined from GC-FID data). Its composition is shown in Table 13 below.

TABLE 13

| Carbon no. | n-paraffins (% v/v) | Iso-paraffins (% v/v) | n-olefins (% v/v) | Iso-olefins (% v/v) | Cyclic olefins (% v/v) | Dienes (% v/v) | Naphthenes (% v/v) | Aromatics (% v/v) |
|---|---|---|---|---|---|---|---|---|
| 3 | 0.01 | 0.00 | 0.00 | 0.00 | 0.00 | 0.00 | 0.00 | 0.00 |
| 4 | 0.00 | 0.00 | 0.00 | 0.00 | 0.00 | 0.00 | 0.00 | 0.00 |
| 5 | 0.12 | 0.04 | 0.00 | 0.00 | 0.00 | 0.00 | 0.04 | 0.00 |
| 6 | 2.64 | 2.14 | 0.00 | 0.00 | 0.08 | 0.00 | 2.98 | 0.37 |
| 7 | 8.32 | 7.15 | 0.00 | 0.00 | 0.00 | 0.00 | 11.02 | 2.38 |
| 8 | 8.06 | 14.00 | 0.12 | 0.56 | 0.00 | 0.00 | 5.47 | 4.92 |
| 9 | 5.08 | 14.63 | 0.51 | 0.00 | 0.00 | 0.00 | 1.43 | 2.86 |
| 10 | 1.52 | 2.05 | 0.00 | 0.00 | 0.00 | 0.00 | 0.00 | 0.44 |
| 11 | 0.26 | 0.57 | 0.00 | 0.00 | 0.00 | 0.00 | 0.00 | 0.00 |
| 12 | 0.00 | 0.00 | 0.00 | 0.00 | 0.00 | 0.00 | 0.00 | 0.23 |

The low boiling component C4A is a mixture of 35% v/v isobutane and 65% v/v n-butane.

Table 14 shows the lower heating value (net calorific value) LHV, Reid vapour pressure RVP, cetane number CN, oxygen content, hydrogen:carbon ratio H/C, upper flammability limit (UFL), vapour compositions and density for each of the resultant blends, as well as for the neat components. Figures for the blends have been calculated using accepted blending rules; vapour pressures for example were calculated using the Antoine equation (derived from the Clausius-Clapeyron relation).

TABLE 14

| Blend/component | LHV (MJ/kg) | RVP (kPa) | CN | Ox (% m) | H/C | UFL (% v/v in air) | Vapour composition at 0° C. (% v/v) | Vapour composition at 10° C. (% v/v) | Density @ 15° C. (kg/m$^3$) |
|---|---|---|---|---|---|---|---|---|---|
| A | 42.7 | 100 | 40 | 3.7 | 2.15 | 8.9 | 27.2 | 39.5 | 708 |
| B | 41.8 | 100 | 45 | 5.5 | 2.17 | 9.6 | 26.5 | 38.8 | 709 |
| C | 39.4 | 100 | 59 | 10.3 | 2.26 | 12.3 | 24.5 | 36.8 | 711 |
| D | 41.9 | 75 | 45 | 5.2 | 2.16 | 9.4 | 18.8 | 28.0 | 717 |
| E | 42.8 | 67 | 40 | 3.3 | 2.13 | 8.7 | 17.4 | 25.6 | 719 |
| F | 42.8 | 60 | 40 | 3.2 | 2.12 | 8.7 | 15.2 | 22.5 | 721 |
| G | 42.0 | 60 | 45 | 5 | 2.15 | 9.3 | 14.4 | 21.7 | 722 |
| H | 40.9 | 60 | 51 | 7.2 | 2.18 | 10.4 | 13.5 | 20.8 | 723 |
| I | 42.1 | 53 | 45 | 4.9 | 2.14 | 9.3 | 12.2 | 18.6 | 724 |
| J | 42.9 | 48 | 40 | 3.1 | 2.11 | 8.6 | 11.4 | 17.2 | 725 |
| DEE | 33.8 | 106 | 90 | 21.6 | 2.50 | 36 | 22.8 | 35.7 | 713 |
| Naphtha | 44.4 | 10 | 32 | 0.0 | 2.06 | 7.6[1] | 1.5 | 2.6 | 733 |
| C4A | 45.3 | 403 | 18 | 0.0 | 2.33 | 8 | * | * | 571 |

[1]assumed to be the same as gasoline
*temperature greater than boiling point of C4A It can be seen from Tables 12 and 14 that blends of DEE with a petroleum derived refinery naphtha and a low boiling hydrocarbon component can be tailored to have cetane numbers, RVPs and upper flammability limits within ranges which are acceptable for use in CI engines. These blends can be burned in CI engines and can also be safely handled within existing liquid fuel distribution systems.

Example 5

Further alternative CI fuel formulations according to the invention may be prepared by blending together dibutyl ether (DBE), a hydrotreated refinery naphtha component and the low boiling component C4A, in the concentrations shown in Table 15 below.

TABLE 15

Blend Ratios

| Example | Naphtha (% v/v) | C4A (% v/v) | DBE (% v/v) |
|---|---|---|---|
| A | 66 | 17 | 17 |
| B | 58 | 16 | 26 |
| C | 49 | 16 | 35 |
| D | 41 | 16 | 43 |
| E | 75 | 9 | 16 |
| F | 67 | 9 | 24 |
| G | 59 | 9 | 32 |
| H | 50 | 9 | 41 |
| I | 80 | 5 | 15 |
| J | 72 | 5 | 23 |
| K | 63 | 5 | 32 |
| L | 54 | 6 | 40 |

The naphtha fuel component is the petroleum derived hydrotreated refinery naphtha, ex Shell, which is described in Example 4. The low boiling component C4A is the butane mixture described in Example 4.

Table 16 shows the lower heating value (net calorific value) LHV, Reid vapour pressure RVP, cetane number CN, oxygen content, hydrogen:carbon ratio H/C, upper flammability limit (UFL), vapour compositions and density for each of the resultant blends, as well as for the neat components. Figures for the blends have been calculated using accepted blending rules, as in the previous examples.

It can be seen from Tables 15 and 16 that blends of DBE with a petroleum derived refinery naphtha and a low boiling hydrocarbon component can be tailored to have cetane numbers, RVPs and upper flammability limits within ranges which are acceptable for use in CI engines. Again these blends can be burned in CI engines and can also be safely handled within existing liquid fuel distribution systems.

What is claimed is:

1. A compression ignition (CI) fuel formulation comprising (i) a C4 to C8 dialkyl ether (DAE), (ii) a naphtha fuel component and (iii) a low boiling component having a boiling point of from −20 to +20° C. selected from low boiling hydrocarbons, ethers and mixtures thereof.

2. The fuel formulation of claim 1 wherein the dialkyl ether is diethyl ether.

3. The fuel formulation of claim 1 wherein the naphtha fuel component is Fischer-Tropsch derived.

4. The fuel formulation of claim 1 wherein the low boiling component comprises a C3 to C5 hydrocarbon or mixture thereof.

5. The fuel formulation of claim 1 which has a measured cetane number (ASTM D613) of 40 or greater.

6. The fuel formulation of claim 1 having a vapour composition which is greater than its upper flammability limit at 0° C. and a Reid vapour pressure (EN 13016-1) of 100 kPa or less.

7. The fuel formulation of claim 1 having a vapour composition which is greater than its upper flammability limit at 10° C. and a Reid vapour pressure (EN 13016-1) of 60 kPa or less.

8. The fuel formulation of claim 1 wherein the concentration of the DAE is from 5 to 50% v/v.

9. The fuel formulation of claim 1 wherein the concentration of the naphtha fuel component is from 10 to 98% v/v.

10. The fuel formulation of claim 1 wherein the concentration of the low boiling component (iii) is from 0.5 to 30% v/v.

11. The fuel formulation of claim 1 which contains less than 10% v/v of alcohols.

12. A process for the preparation of a CI fuel formulation comprising blending together (i) a C4 to C8 DAE, (ii) a naphtha fuel component and (iii) a low boiling component having a boiling point of from −20 to +20° C. selected from low boiling hydrocarbons, ethers and mixtures thereof.

TABLE 16

Blend Properties

| Blend/ component | LHV (MJ/kg) | RVP (kPa) | CN | Ox (% m) | H/C | UFL (% v/v in air) | Vapour composition at 0° C. (% v/v) | Vapour composition at 10° C. (% v/v) | Density @ 15° C. (kg/m$^3$) |
|---|---|---|---|---|---|---|---|---|---|
| A | 43.4 | 100 | 40 | 2.3 | 2.12 | 7.8 | 29.0 | 41.1 | 712 |
| B | 42.8 | 100 | 45 | 3.4 | 2.14 | 7.9 | 29.1 | 41.4 | 715 |
| C | 42.3 | 100 | 50 | 4.5 | 2.16 | 8.0 | 29.2 | 41.5 | 717 |
| D | 41.7 | 100 | 55 | 5.6 | 2.17 | 8.1 | 29.3 | 41.6 | 720 |
| E | 43.5 | 60 | 40 | 2 | 2.10 | 7.8 | 16.9 | 24.3 | 723 |
| F | 42.9 | 60 | 45 | 3.1 | 2.12 | 7.8 | 17.0 | 24.3 | 726 |
| G | 42.4 | 60 | 50 | 4.2 | 2.14 | 7.9 | 17.1 | 24.4 | 729 |
| H | 41.9 | 60 | 55 | 5.3 | 2.15 | 8.0 | 17.1 | 24.5 | 731 |
| I | 43.5 | 40 | 40 | 1.9 | 2.09 | 7.8 | 10.7 | 15.5 | 729 |
| J | 43.0 | 40 | 45 | 3 | 2.11 | 7.8 | 10.8 | 15.6 | 732 |
| K | 42.5 | 40 | 50 | 4.1 | 2.13 | 7.9 | 10.9 | 15.9 | 734 |
| L | 41.9 | 40 | 55 | 5.1 | 2.14 | 8.0 | 11.1 | 15.9 | 737 |
| DBE | 38.3 | 106 | 90 | 21.6 | 2.50 | 36 | 22.8 | 35.7 | 764 |
| Naphtha | 44.4 | 10 | 32 | 0.0 | 2.06 | 7.6[1] | 1.5 | 2.6 | 733 |
| C4A | 45.3 | 403 | 18 | 0.0 | 2.33 | 8 | * | * | 571 |

[1]assumed to be the same as gasoline
*temperature greater than boiling point of C4A 13. A method of operating an internal combustion engine, and/or a vehicle which is driven by an internal combustion engine comprising introducing into a combustion chamber of the engine a CI fuel formulation of claim 1.

14. A compression ignition (CI) fuel formulation comprising (i) a C4 to C8 dialkyl ether (DAE), (ii) a naphtha fuel component and (iii) a low boiling component having a boiling point of 50° C. or below selected from C3 to C5 hydrocarbons, di(C1 to C3 alkyl)ethers and mixtures thereof.

15. The composition of claim 14 wherein the low boiling component is selected from the group consisting of n-butane, isobutene, isobutene, but-1-ene, methyl ethyl ether and mixtures thereof.

16. The fuel formulation of claim 14 wherein the concentration of the DAE is from 5 to 50% v/v.

17. The fuel formulation of claim 14 wherein the concentration of the naphtha fuel component is from 10 to 98% v/v.

18. The fuel formulation of claim 14 wherein the concentration of the low boiling component (iii) is from 0.5 to 30% v/v.

19. The fuel formulation of claim 14 which contains less than 10% v/v of alcohols.

\* \* \* \* \*